(12) United States Patent
Tucker et al.

(10) Patent No.: US 7,844,997 B2
(45) Date of Patent: Nov. 30, 2010

(54) SECURING STANDARD TEST ACCESS PORT WITH AN INDEPENDENT SECURITY KEY INTERFACE

(75) Inventors: James L. Tucker, Clearwater, FL (US); Brian R. Bernier, Tampa, FL (US)

(73) Assignee: Honeywell International Inc., Morristown, NJ (US)

( * ) Notice: Subject to any disclaimer, the term of this patent is extended or adjusted under 35 U.S.C. 154(b) by 1074 days.

(21) Appl. No.: 11/330,790

(22) Filed: Jan. 12, 2006

(65) Prior Publication Data

US 2007/0162956 A1    Jul. 12, 2007

(51) Int. Cl.
  G06F 7/04    (2006.01)
  G08B 29/00   (2006.01)
(52) U.S. Cl. .......................... 726/2; 726/34
(58) Field of Classification Search .......... 726/2, 726/34
  See application file for complete search history.

(56) References Cited

U.S. PATENT DOCUMENTS

| | | | | |
|---|---|---|---|---|
| 5,339,320 A * | 8/1994 | Fandrich et al. | ............. | 714/724 |
| 5,774,545 A * | 6/1998 | Raghavachari | ............... | 713/189 |
| 6,466,048 B1 * | 10/2002 | Goodman | ........................ | 326/8 |
| 6,523,099 B1 * | 2/2003 | Namekawa | .................. | 711/163 |
| 7,133,990 B2 * | 11/2006 | Link et al. | ................... | 711/164 |
| 7,363,564 B2 * | 4/2008 | Moss et al. | .................. | 714/734 |
| 7,386,774 B1 * | 6/2008 | Chatterjee et al. | ........... | 714/726 |
| 2002/0082797 A1 * | 6/2002 | Deweese et al. | ............ | 702/122 |
| 2003/0177373 A1 * | 9/2003 | Moyer et al. | ................. | 713/189 |
| 2004/0025027 A1 * | 2/2004 | Balard et al. | ................. | 713/183 |
| 2004/0128523 A1 * | 7/2004 | Fujioka | ....................... | 713/189 |
| 2005/0187022 A1 * | 8/2005 | Walker et al. | .................. | 463/42 |
| 2005/0268174 A1 * | 12/2005 | Kumagai | ...................... | 714/38 |
| 2005/0289355 A1 * | 12/2005 | Kitariev et al. | .............. | 713/182 |
| 2006/0131691 A1 * | 6/2006 | Roozeboom et al. | ........ | 257/534 |
| 2007/0044158 A1 * | 2/2007 | Cruzado et al. | ................ | 726/27 |
| 2007/0188351 A1 * | 8/2007 | Brown et al. | ................. | 340/999 |

* cited by examiner

*Primary Examiner*—Michael Pyzocha
(74) *Attorney, Agent, or Firm*—Fogg & Powers LLC (57) ABSTRACT

A system to prevent unauthorized access to a protected device includes a test access port operable to mate with a test access connector, a security key port operable to mate with a security key and a security device in electrical communication with the test access port and the security key port. The protected device is in electrical communication with the test access port when the security device is enabled based on the security key. The test equipment is authorized for access to the protected device when the security device is enabled.

29 Claims, 7 Drawing Sheets

SECURING STANDARD TEST ACCESS PORT WITH AN INDEPENDENT SECURITY KEY INTERFACE

GOVERNMENT LICENSE RIGHTS

The U.S. Government may have certain rights in the present invention as provided for by the terms of Government Contract No. FA8650-04-C-8011 awarded by the United States Air Force.

BACKGROUND

In some applications, a manufacturer or designer of electronics equipment wishes to prevent third parties from reverse engineering such equipment. The manufacturer or designer of electronics equipment often tries to prevent reverse engineering at the unit or system level, the board level, the component level or the chassis level or all of the above.

Some reverse-engineering techniques access electronics by communicating with a housed device using externally accessible interfaces. A debug or test port is typically designed to provide a mechanism by which an external device is able to inspect and change the state of various items of electronics that are internally housed in a chassis, integrated circuit housing and/or a multi-chip-module. For example, an external device can inspect and/or change the state of registers, memory or I/O interfaces of the internally housed device via a debug port or test port. Thus in some cases, a debug port or test port can be exploited to reverse engineer internally housed devices and/or chips.

The electrical systems within manufactured products often include proprietary designs. In some cases the board and/or chip manufacturers integrate the board and/or chip into systems, test the system via a test port and then sell the system to a customer. The test port or debug port is available to the customer that purchased the system.

In other cases, the board and/or chip manufacturers provide customers with a test access port that the customer uses to integrate the board and/or chip into their system. Once the customer has integrated their system, they may sell the system to yet another customer.

To facilitate the test and integration of digital integrated circuits, the Joint Test Access Group (JTAG) has developed the IEEE 1149.1 standard that defines a standard test access port and boundary-scan architecture for digital integrated circuits and for the digital portion of mixed analog/digital integrated circuits. The IEEE 1532 standard extends the IEEE 1149.1 standard to support programmable devices. Both standards provide in-system monitoring of logic states and access of boundary scan addressable memory contents. The capabilities of the JTAG interface port can be used by reverse engineers to probe the chips and boards to obtain the proprietary information about design and/or operation of the probed chips and boards.

If the information that a reverse engineer obtains by reverse engineering proprietary boards and/or chips is related to advanced military applications, the information leak may endanger national security. If the information that a reverse engineer obtains by reverse engineering proprietary boards and/or chips is related to commercial applications, the information leak could be used to undermine the economic security of the commercial vendor.

For the reasons stated above and for other reasons stated below which will become apparent to those skilled in the art upon reading and understanding the specification, there is a need in the art to limit access to proprietary boards and chips via a test access port to authorized personnel.

SUMMARY

The embodiments of the present invention provide methods and systems prevent unauthorized access to protected devices and will be understood by reading and studying the following specification.

One aspect of the present invention provides a system to prevent unauthorized access to a protected device. The system includes a test access port operable to mate with a test access connector, a security key port operable to mate with a security key and a security device in electrical communication with the test access port and the security key port. The protected device is in electrical communication with the test access port when the security device is enabled based on the security key. The test equipment is authorized for access to the protected device when the security device is enabled.

Another aspect of the present invention provides a method to prevent unauthorized access to a protected device through a test access port. The method includes intercepting a test-mode-select input at a security device in communication with the protected device, receiving a key input from a security key at the security device, determining if the key input is valid, and enabling input of the test-mode-select input to the protected device based on a positive determination. The protected device is operable to output test data at the test access port based on the enabling. The method additionally includes blocking input of the test-mode-select input to the protected device based on a negative determination so that the protected device is inoperable to output test data at the test access port based on the blocking input.

Yet another aspect of the present invention provides a program product. The program product includes program instructions, embodied on a storage medium, that are operable to cause at least one of a programmable processor and a custom integrated circuit to receive a test-mode-select input at a security device in communication with a protected device, receive a key input from a security key at the security device, determine if the key input is valid, enable communication between test equipment and the protected device based on a positive determination and block communication between test equipment and the protected device based on a determination.

Yet another aspect of the present invention provides a system to prevent unauthorized access to a protected device. The system includes means for receiving a key input at a security device, means for providing test access to a protected device at the security device, means for determining if the key input is valid and means for controlling a test-mode-select input to the protected device based on a determination of the determining means.

DRAWINGS

Embodiments of the present invention can be more easily understood and further advantages and uses thereof more readily apparent, when considered in view of the description of the preferred embodiments and the following figures in which.

In accordance with common practice, the various described features are not drawn to scale but are drawn to emphasize features relevant to the present invention. Reference characters denote like elements throughout figures and text.

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

Figure 1:
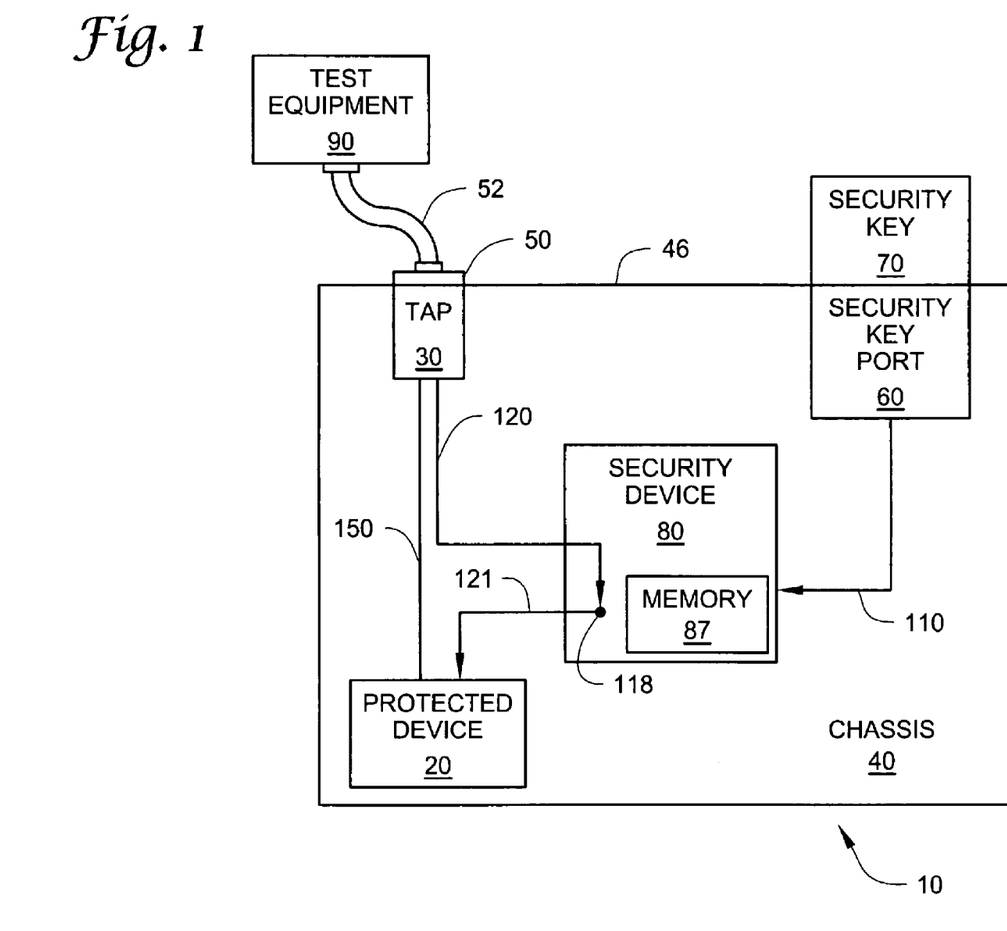
FIG. 1 illustrates a block diagram of an embodiment of a system in an enabled state in accordance with the present invention.
Figure 2:
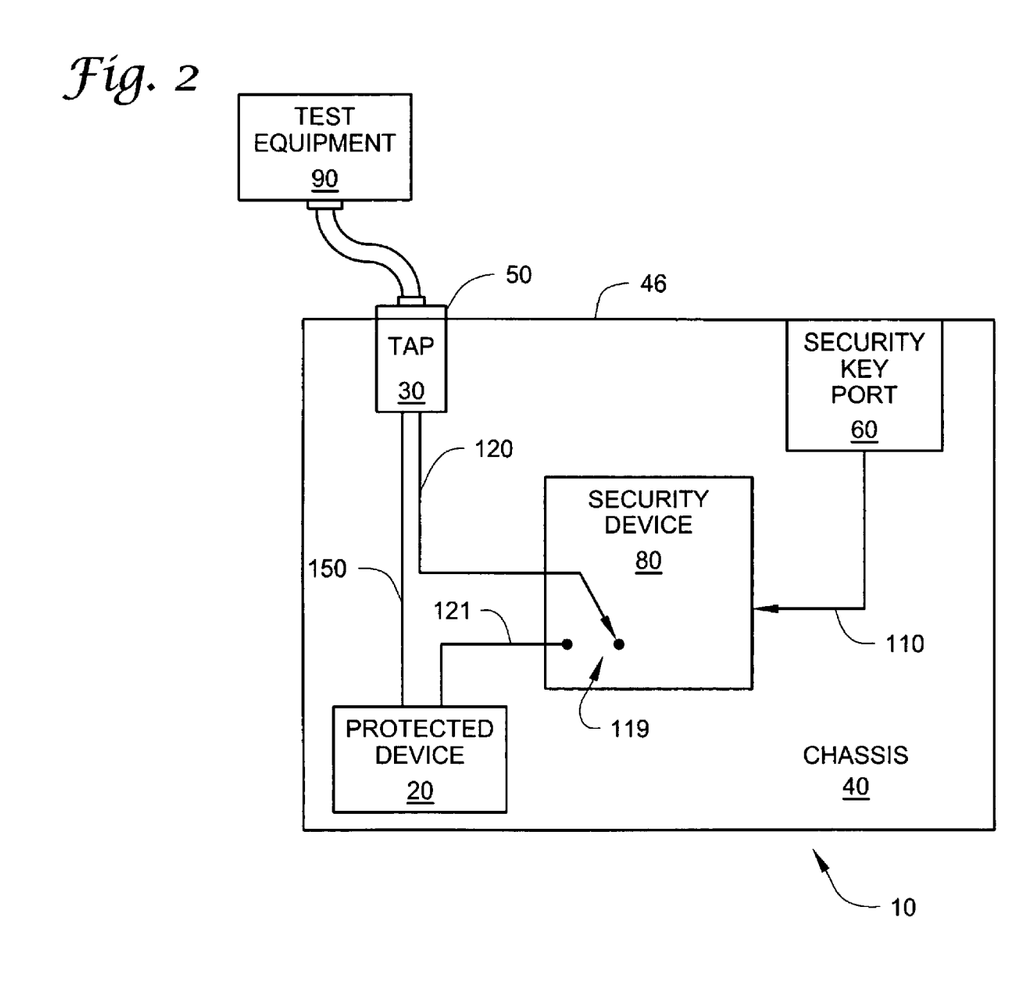
FIG. 2 illustrates a block diagram of an embodiment of the system in a disabled state in accordance with the present invention.

FIG. 1 illustrates a block diagram of an embodiment of a system 10 in an enabled state in accordance with the present invention. FIG. 2 illustrates a block diagram of an embodiment of the system 10 in a disabled state in accordance with the present invention. The system 10 is operable to prevent unauthorized access to a protected device 20 in accordance with the present invention.

The system 10 includes a test access port (TAP) 30, a security key port 60, and a security device 80, which are operable to protect the protected device 20 from tampering. In this embodiment, the system 10 is located with the protected device 20 within a closed chassis 40. The protected device 20 is secure from tampering or evaluation by unauthorized persons, when the chassis 40 is closed. The system and the protected device 20 can be co-located outside a chassis 40 as described below with reference to FIGS. 6 and 7.

The test access port 30 is accessible from an outer surface 46 of the chassis 40 and is operable to mate with a test access connector 50. The security key port 60 is accessible from the outer surface 46 of the chassis 40 and is operable to mate with a security key 70. The security device 80 is positioned within the chassis 40 in bi-directional communication with the test access port 30 and the security key port 60.

As shown in FIG. 1, the system 10 is in an enabled state when the security device 80 is enabled. The security device 80 is enabled when a valid security key 70 is mated with the security key port 60. When the security device 80 is enabled, the test equipment 90 is authorized for access to the protected device 20. Thus, the protected device 20 within the chassis 40 is in bi-directional electrical communication with the test access port 30 when the security device 80 is enabled. The electrical communication is established via connection 120, connection 121 and connection 150. Connection 120 is linked to connection 121 via point 118 as shown in FIG. 1.

The security device 80 is disabled when an invalid security key is mated with the security key port 60. Additionally as shown in FIG. 2, the security device 80 is disabled when there is no security key 70 mated with the security key port 60 so the security device 80 does not detect a valid key input from the security key port 60 via connection 110. When the security device 80 is disabled, the test equipment 90 is not authorized for access to the protected device 20. When the security device 80 is disabled, the protected device 20 within the chassis 40 does not receive electrical communication via connection 120 from the test access port 30. In this case, connection 120 is not linked to connection 121 as shown by disconnect 119 in FIG. 2.

In one embodiment, a valid security key 70 includes a valid key code that matches the key code stored in the security device 80. The valid key code is input from the valid security key 70 to the security key port 60 as a key input. In one implementation of this embodiment, security key port 60 triggers the security key 70 to send the key input to security device 80 via connection 110 when the security key 70 is plugged into the security key port 60.

In the event that security key 70 is an invalid security key for the system 10, an invalid key code is input from the invalid security key to the security key port 60 as an invalid key input. The invalid key input does not match with the valid key code stored in the security device 80.

In one implementation of this embodiment, security key port 60 triggers the invalid security key to send an invalid key input to security device 80 when the invalid security key is plugged into the security key port 60. In another implementation of this embodiment, the invalid security key is not triggered to send any key input to the security device when the invalid security key is plugged into the security key port 60.

In yet another embodiment, a valid security key 70 is determined by checking the response of the security key 70 to a security algorithm input to the security key 70 from the security device 80 or from the security key port 60. In this case, the key input is the response sent from the security key 70 to the security device 80. If the response from the security key 70 is incorrect, the key input is invalid and the security device 80 is disabled. If the response from the security key 70 is correct, the key input is valid and the security device 80 is enabled.

Specifically, the test-mode-select (TMS) input from the test access connector 50 is received at the security device 80 via connection 120. When system 10 is in the disabled state, the TMS input is not input to the protected device 20 via connection 121 since connection 120 and connection 121 are separated by disconnect 119 (FIG. 2). Many electrical circuit configurations are possible to form a disconnect 119 between connection 120 and connection 121 as known in the art. Since the protected device 20 does not receive the TMS input, the test-data-out output is not sent to the test access port 30 via connection 150.

Security device 80 receives the key input via connection 110 from the security key 70. The security device 80 receives a test-mode-select (TMS) input via a connection 120 from the test access connector 50 mated with the test access port 30. The security device 80 checks the key input with for validity. If the key input is valid, the security device 80 is enabled and the TMS input is input via connection 121 to the protected device 20. The test-data-out output is received via connection 150 from the protected device 20 to the test access port 30, responsive to the TMS input. The test equipment 90 is electrically connected via the test access connector 50 and a connection 52 to receive the test-data-out output.

The connection 52, the connection 110, the connection 150, the connection 120 and the connection 121 are electrical connections formed from conductive wires, trace lines, lead lines and the like as known in the art. In one implementation of this embodiment, the connection 110, the connection 150, the connection 120 and the connection 121 are optical and/or electro-optical connections enabled by optical fibers, optical sources, and optical connectors, splices and the like as known in the art. In another implementation of this embodiment, the connection 110, the connection 150, the connection 120 and the connection 121 are optical connections enabled by free space optical interconnections. In one embodiment of this implementation, the optical beams are directed by optical components such as mirrors, diffractive optical elements, lens and the like as known in the art.

In one implementation of this embodiment, the test access port 30 is a Joint Test Access Group (JTAG) port and the test access connector 50 is a JTAG connector. In another implementation of this embodiment, the test access port is a Joint Test Access Group (JTAG) port, the test access connector is a JTAG connector, and the test-mode-select input is a JTAG input. In yet another implementation of this embodiment, the test access port 30 and the security key port 60 are on different surfaces of the chassis 40. In yet another implementation of this embodiment, the protected device 20 includes a chain of protected devices.

In one implementation of this embodiment, other signals in addition to a TMS input signal are intercepted at the security device 80. In one exemplary embodiment, the signal correlated to the test-data-in input and the test-clock input are intercepted at the security device 80 in addition to the TMS input. In another exemplary embodiment, the test-data-in input is intercepted at the security device 80 in addition to the TMS input. In yet another exemplary embodiment, the test-clock input is intercepted at the security device 80 in addition to the TMS input.

Figure 3:
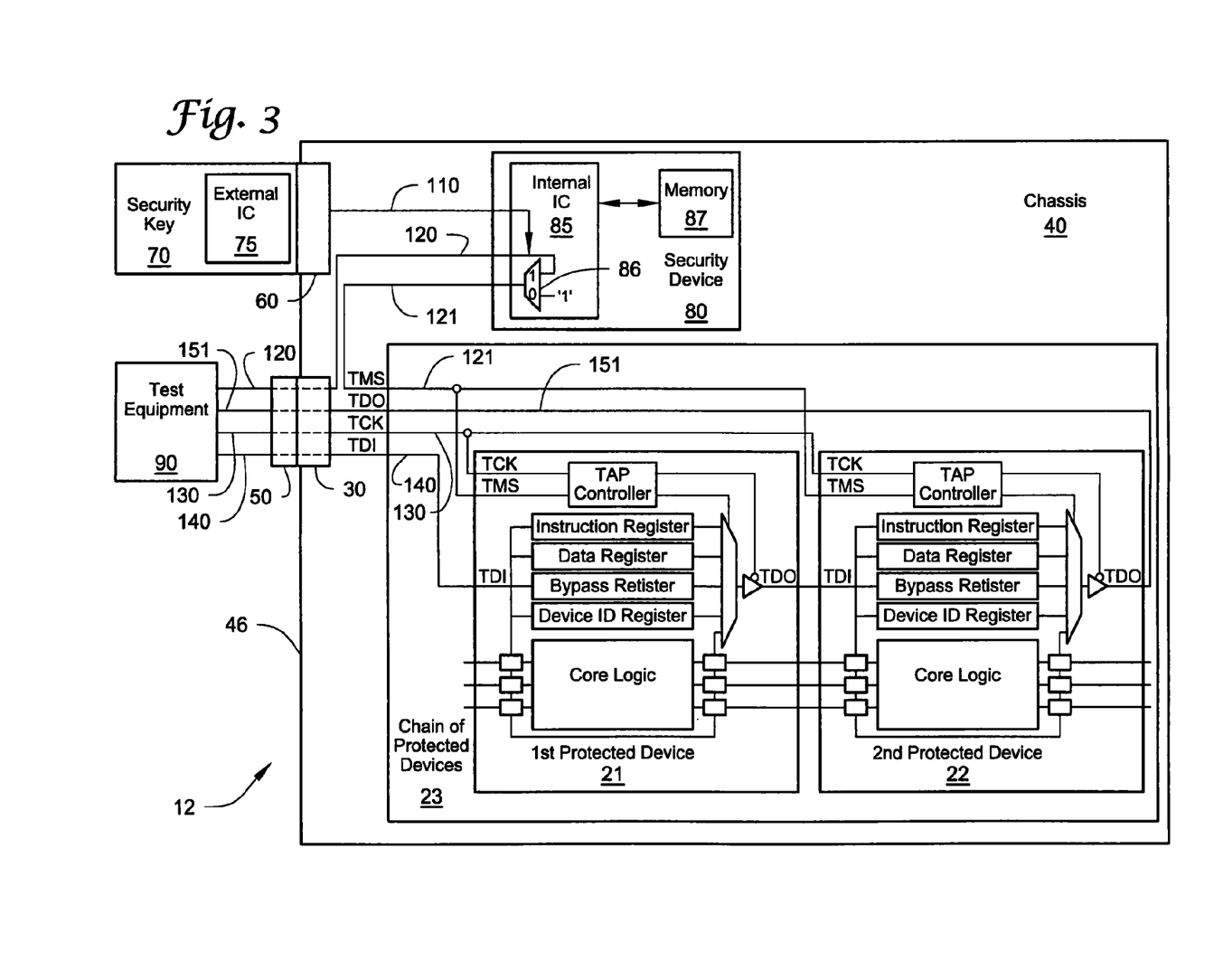
FIG. 3 illustrates a block diagram of details of an embodiment of a system to prevent unauthorized access to a protected device in accordance with the present invention.

FIG. 3 illustrates a block diagram of details of an embodiment of a system 12 to prevent unauthorized access to a protected device in accordance with the present invention. System 12 includes a chain of protected devices 23 rather than a single protected device 20 as described above with reference to system 10 of FIG. 1. The illustrated exemplary chain of protected devices 23 includes first protected device 21 and second protected device 22.

As shown in FIG. 3, the security device 80 is in the enabled state since a valid security key 70 is mated with the security key port 60. The security key 70 includes an external integrated circuit 75 and the security device 80 includes an internal integrated circuit 85. The security device 80 is enabled when the internal integrated circuit 85 authenticates the external integrated circuit 75 based on a signal received via connection 110 from the external integrated circuit 75. In one implementation of this embodiment, the memory 87 stores a valid key code. When the key input signal is received from the security key 70 mated with the security key port 60 via connection 110, the internal integrated circuit 85 checks the key input for validity. If the key input is valid, the multiplexer 86 is switched to select the signal input via connection 120 to be output to connector 121.

The test access port 30 and a test access connector 50 each include connectable test-mode-select (TMS) connections 120, test-data-in (TDI) connections 140, test-clock (TCK) connections 130, and test-data-out (TDO) connections 151 that are electrically and/or electro-optically connected when the test access connector 50 mates with the test access port 30.

The test-mode-select (TMS) connections 120 input the TMS signal to the security device 80. The TDI connections 140 input the test-data-in signals from the test equipment 90 to the chain of protected devices 23. The TCK connections 130 input the test-clock signal from the test equipment 90 to the chain of protected devices 23. The TDO connections 151 output the test-data-out (TDO) from the chain of protected devices 23 to the test equipment 90 when the security device 80 is enabled. The connections 120, connections 130, connections 140, and connections 151 are electrical connections formed from conductive wires, trace lines, and the like as known in the art. In one implementation of this embodiment, the connections 120, connections 130, connections 140, and connections 151 are optical and/or electro-optical connections as known in the art.

Figure 4:
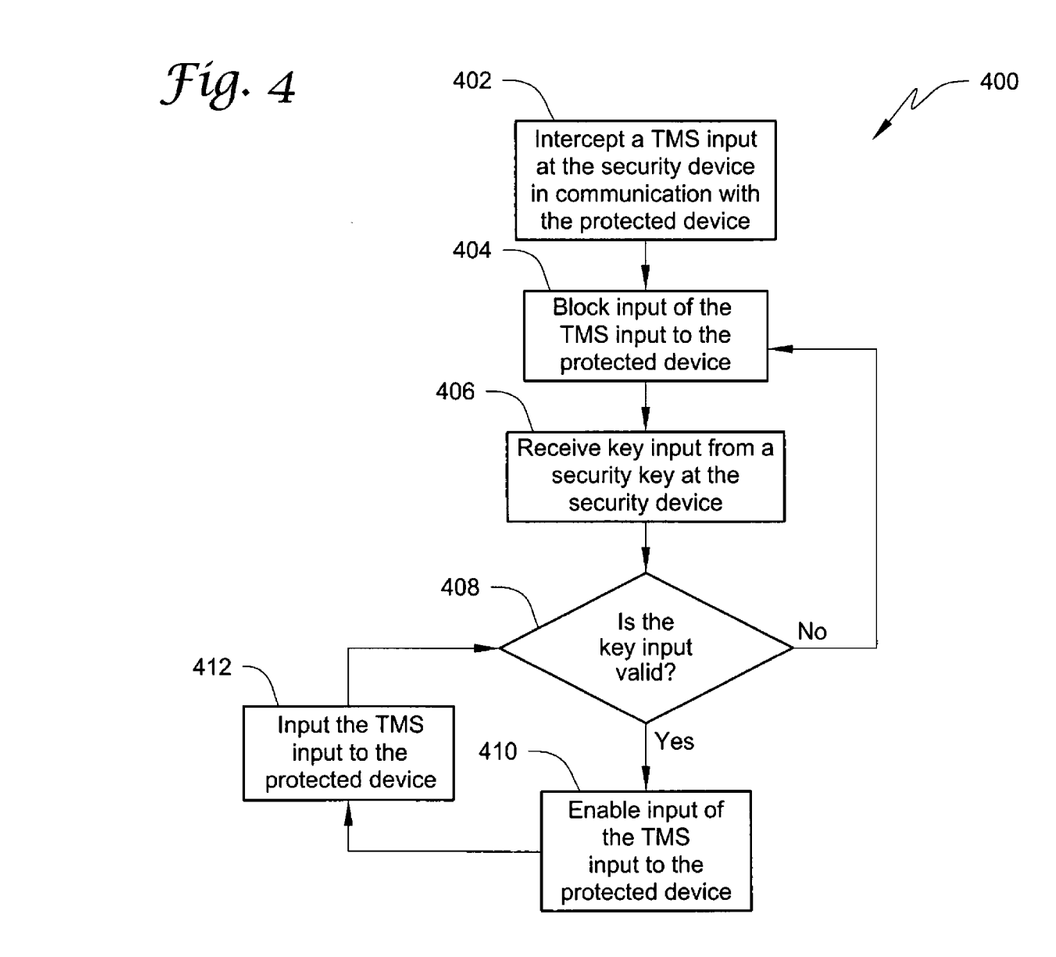
FIG. 4 is a flow diagram illustrating a method to prevent unauthorized access to a protected device in accordance with an embodiment of the present invention.

FIG. 4 is a flow diagram 400 illustrating a method to prevent unauthorized access to a protected device 20 in accordance with an embodiment of the present invention. The security device 80 has embodied on a storage medium at least one program product including program instructions that are operable to cause at least one of a programmable processor and a custom integrated circuit to perform the operations described with reference to flow diagram 400. The embodiment of flow diagram 400 shown in FIG. 4 is described with reference to the system 10 of FIGS. 1 and 2. Another embodiment of the security device consists of a non-processor based system with logic that explicitly performs the function shown in flow diagram 400 using logic. In one embodiment of flow diagram 400, the protected device 20 is a chain of protected devices 23.

At block 402, the security device 80, which is in communication with the protected device 20, intercepts the TMS input. The TMS input is received at the security device 80 from the test access port 30 via connection 120. The TMS input continuously or periodically occurs while the test equipment 90 is in communication with the security device 80 via the connection 52, the test access port connector 50 and the test access port 30.

At block 404, the security device 80 blocks input of the TMS input to the protected device 20 so that the protected device 20 is inoperable to output test data at test access port 30 based on the blocking of the TMS input. The TMS circuit path is disabled as shown in FIG. 2. The disabled TMS circuit path includes the connection 120 from the test access port 30 to the security device 80 that carries the TMS input generated by the test equipment 90. When the TMS circuit path is disabled, the TMS input is not sent from the connection 120 to the connection 121. Since the TMS circuit path is disabled, any TMS input received at the security device 80 via test access port 30 do not reach the protected device 20. In one implementation of this embodiment, the test access port 30 is a Joint Test Access Group (JTAG) port, the test access connector 50 is a JTAG connector, and the test-mode-select input is a JTAG input.

At block 406, the security device 80 receives a key input from a security key 70 via connection 110. At block 408, the security device 80 determines if the key input is valid. In one implementation of this embodiment, the security device 80 determines if a valid key code that is stored in the memory 87 matches the key input from the security key 170. In another implementation of this embodiment, the security device 80 inputs a security algorithm input to the security key 70 and checks the response of the security key 70 to the security algorithm input to make the determination of validity. In this case, the response of the security key 70 to the security algorithm input is the key input.

If it is determined at block 408, that the key input is not valid, the flow of flow diagram 400 proceeds to block 404 and the security device 80 continues to block input of the TMS input to the protected device 20 by preventing a connection at point 118 (FIG. 1) between connection 120 and connection 121.

If it is determined at block 408, that the key input is valid, the flow of flow diagram 400 proceeds to block 410. At block 410, the security device 80 enables the input of the TMS input to the protected device 20 based on a positive determination by electrically or electro-optically connecting connection 120 to connection 121. The disconnect 119 (FIG. 2) is closed and the connection 120 is linked to connection 121 at point 118 (FIG. 1). Thus, the enabled TMS circuit path includes connection 120 from the test access port 30 to the security device 80 and connection 121 from the security device 80 to the protected device 20. In this manner, the protected device 20 is operable to output test data at the test access port 30 based on the enabling. The method by which the security device 80 enables the input of the TMS input to the protected device 20 is described in detail below with reference to blocks 518 and 520 of method 500 in FIG. 5.

At block 412 the TMS input is input to the protected device 20 via connection 121 and the flow returns to block 408. In this manner, the security device 80 continues to determine if the key input is valid. The security device 80 continuously enables the TMS input to the protected device 20 as long as the key input is valid. If receipt of the key input at the security device 80 is stopped, the TMS input to the protected device 20 stops.

In one implementation of the flow diagram 400, the test equipment 90 terminates testing by sending a termination code to the security device 80. If the security key 70 is removed from the a security key port 60 prior to sending a security termination code to the security device 80, the TMS input to the chain of protected device 20 is blocked the next time the key input is received at the security device 80. In this embodiment, the TMS input to the protected device 20 is only unblocked after a separate security process is implemented by the user of the test equipment 90, the protected device 20 and the system 10. This embodiment prevents an unauthorized person from removing the security key 70 from the security key port 60 and later using the security key 70 to retrieve data from the protected device 20 or chain of protected devices 23.

Figure 5:
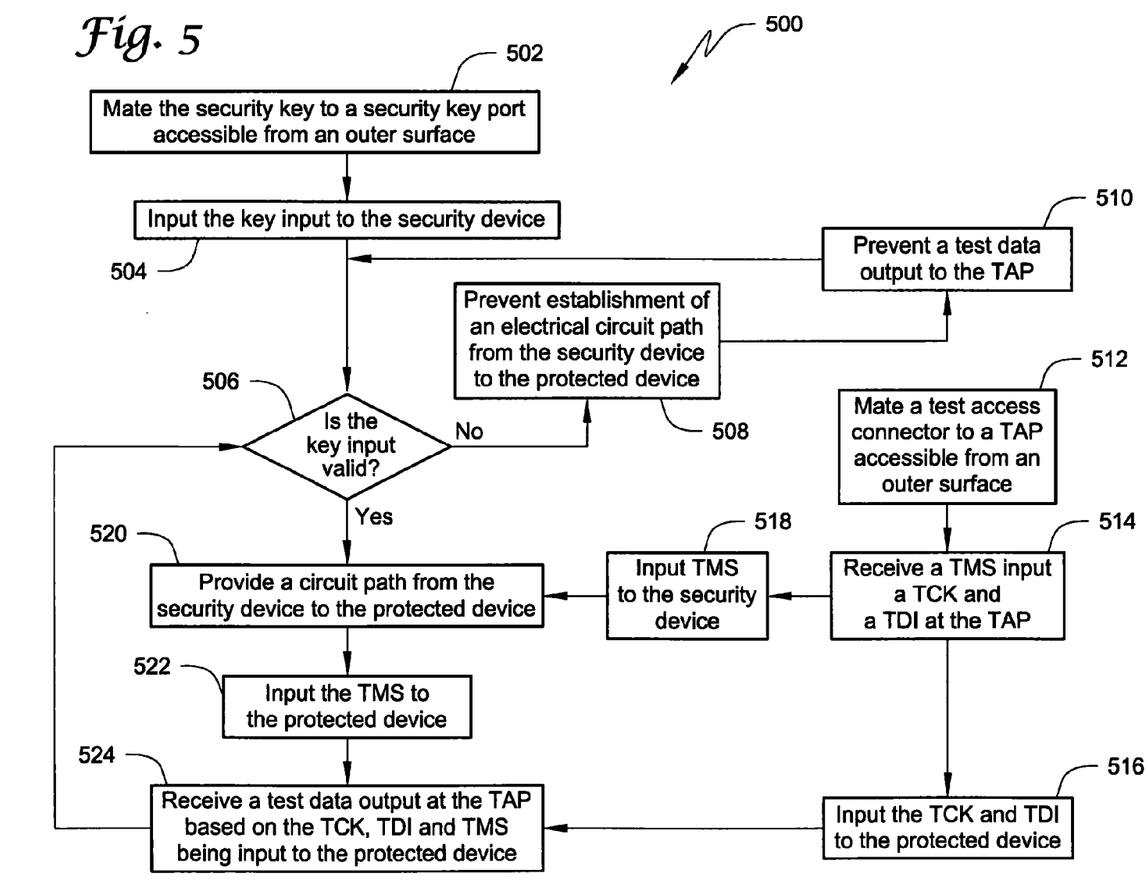
FIG. 5 is a flow diagram illustrating a method to prevent unauthorized access to a protected device in accordance with an embodiment of the present invention.

FIG. 5 is a flow diagram 500 illustrating a method to prevent unauthorized access to a protected device 20 in accordance with an embodiment of the present invention. The security device 80 has embodied on a storage medium at least one program product including program instructions that are operable to cause at least one of a programmable processor and a custom integrated circuit to perform the operations described with reference to flow diagram 500. The embodiment of flow diagram 500 shown in FIG. 5 is described with reference to the system 12 of FIG. 3. Flow diagram 500 is applicable to other systems including system 10 as described above with reference to FIGS. 1 and 2. In one embodiment of flow diagram 500, the chain of protected devices 23 is a protected device 20.

At blocks 502, 504, 512-518, the system 12 is prepared for data transfer between the test equipment 90 and the chain of protected devices 23. The security key 70 is mated to the security key port 60 accessible from an outer surface 46 of the chassis 40 (block 502). When the security key 70 is mated to the security key port 60, the security key 70 inputs the key input to the security device 80 (block 504). The test access port connector 50 of test equipment 90 is mated to the test access port 30 that is accessible from an outer surface 46 of the chassis 40 (block 512). When the test access port connector 50 is mated to the test access port 30, the test access port 30 receives the TMS input, the test-clock (TCK) input and the test-data-in (TDI) input (at block 514). In one implementation of this embodiment, the test equipment 90 is triggered to input the TMS input, the test-clock input and the test-data-in input to the test access port 30 when the test access connector 50 is plugged into the test access port 30. The test access port 30 receives the input from the test equipment 90 via connections 120, 130, and 140.

At block 516, the test-clock (TCK) input and the test-data-in (TDI) input are input to the protected device 20. In the implementation illustrated in FIG. 3, the test-clock (TCK) input is input to the TAP controller in the first protected device 21 and in the second protected device 22 via connection 130. In the implementation illustrated in FIG. 3, the test-data-in (TDI) input is input to the bypass registers in the first protected device 21 and the second protected device 22 via connection 140.

At block 518, the TMS input is input from the test access port 30 to the security device 80 via connection 120. In the implementation illustrated in FIG. 3, multiplexer 86 in the internal integrated circuit 85 intercepts the TMS input via connection 120.

Once system 12 is prepared for data transfer between the test equipment 90 and the chain of protected devices 23 at blocks 502, 504, 512-518, the flow proceeds to block 506. At block 506, the security device 80 determines if the key input is valid. The internal integrated circuit 85 makes the determination.

If it is determined at block 506, that the key input is not valid, the flow of flow diagram 500 proceeds to block 508. At block 508, the security device 80 prevents establishment of a circuit path from the security device 80 to the chain of protected devices 23 so that no TMS input signal is received by the TAP controllers in the first protected device 21 and the second protected device 22. At block 510, the system 12 prevents a test-data-out (TDO) output to the test access port 30 based on the preventing of block 508. Since no TMS input signal is received by the TAP controllers in the first protected device 21 and the second protected device 22 via connection 150, the system 12 prevents a test-data-out (TDO) output to the test access port 30. The flow proceeds to block 506, where it is again determined if a valid key input has been received. The flow proceeds to block 520 if it is determined at block 506 that the key input is valid.

At block 520, the security device 80 provides a circuit path from the security device 80 to the protected device 20. The circuit path from the security device 80 to the chain of protected devices 23 includes connection 121. As shown in FIG. 3, the connection between 120 and 121 is established through the multiplexer 86 if the key input is valid. At block 522, the security device 80 inputs the TMS input to the chain of protected devices 23 via the circuit path provided at block 520 along connection 121.

At block 524, the test access port 30 receives a test-data-out (TDO) output via connection 150. The test-data-out (TDO) output is sent to the test access port 30 based on the protected device 20 receiving the TMS input (block 522) and based on receiving the test-clock (TCK) input and the test-data-in (TDI) input (block 516). The test-data-out (TDO) output is generated by the chain of protected devices 23 in response to the received test-data-in input, the TMS input and the test-clock input. The flow of flow diagram 500 then proceeds to block 506.

In this manner, the security device 80 continues to determine if the key input is valid. The security device 80 continuously enables the TMS input to the chain of protected devices 23 as long as the key input is valid. If receipt of the valid key input at the security device 80 is stopped, the TMS input to the chain of protected devices 23 stops when the flow does not go to block 520 but instead flows to block 508.

In one implementation of the flow diagram 500, the security key 70 is removed from the security key port 60 prior to receiving a security termination code at the security device 80. In that case, the TMS input to the chain of protected devices 23 is blocked the next time the valid security key 70 is mated to the security key port 60 and the valid key input is received at the security device 80. In this embodiment, the TMS input to the protected device 20 is only unblocked after a separate security process is implemented by the user of the test equipment 90 and the chassis 40. This embodiment prevents an unauthorized person from taking an operational security key 70 from a chassis 40 and later accessing the chain of protected devices 23 or a protected device 20.

In one implementation of these embodiments, the security device 80 including the internal integrated circuit 85 is installed on a circuit card to control access via test access port 30 to components on the card. In another implementation of these embodiments, the security device 80 including the internal integrated circuit 85 is installed within a circuit enclosure, such as a chassis, to control access to the contents of an enclosure that houses multiple circuit cards. In yet another implementation of these embodiments, the security device 80 including the internal integrated circuit 85 is incorporated in a chip design. Thus, the present invention can be implemented on a chip level and a box level.

Implementations of the embodiments described herein make it possible to prevent unauthorized access, such as reverse engineering, to a protected device 20 through a test access port 30 on a chassis 40 that encloses the protected device 40. Access to the protected device 20 is provided when a key input that is valid is received at a security device 80. Additionally by using implementations of the embodiments described herein, test data is output from one or more protected devices 20 only if the key input is determined to be a valid key code. Likewise, test data is not output from one or more protected devices 20 if the key input is not determined to be a valid key code. In order to implement the embodiments described herein, a security key 70 is plugged into a security key port 60 and a test access connector 50 is plugged into a test access port 30. The security key port 60 and the test access port 30 are accessible on the chassis 40 housing the protected device 20. In an embodiment in which the unauthorized access is prevented on a chip level, the security key port 60 and the test access port 30 are accessible on the chip level.

Implementations of the system provide one or more circuit paths from the security device 80 to the protected device 20 in order to allow the test-mode-select input to be input to the protected devices 20. Implementations of the system provide one or more circuit paths from the test equipment 90 to the protected device 20 to input the test-data-in input and clock input to the protected device 20. Implementations of the system provide one or more circuit paths from the protected device 20 to the test equipment 90 to output the test-data-out output from the protected device.

Implementations of the system block the circuit path 121 from the security device 80 to the protected device 20 if the positive determination of a match between a key input and a valid key code becomes a negative determination. The determination becomes a negative determination when an invalid key code is received after a valid key code had been received. Likewise, implementations of the system unblock the circuit path 121 from the security device 80 to the protected device 20 if the negative determination becomes a positive determination when a valid key code is received.

Figure 6:
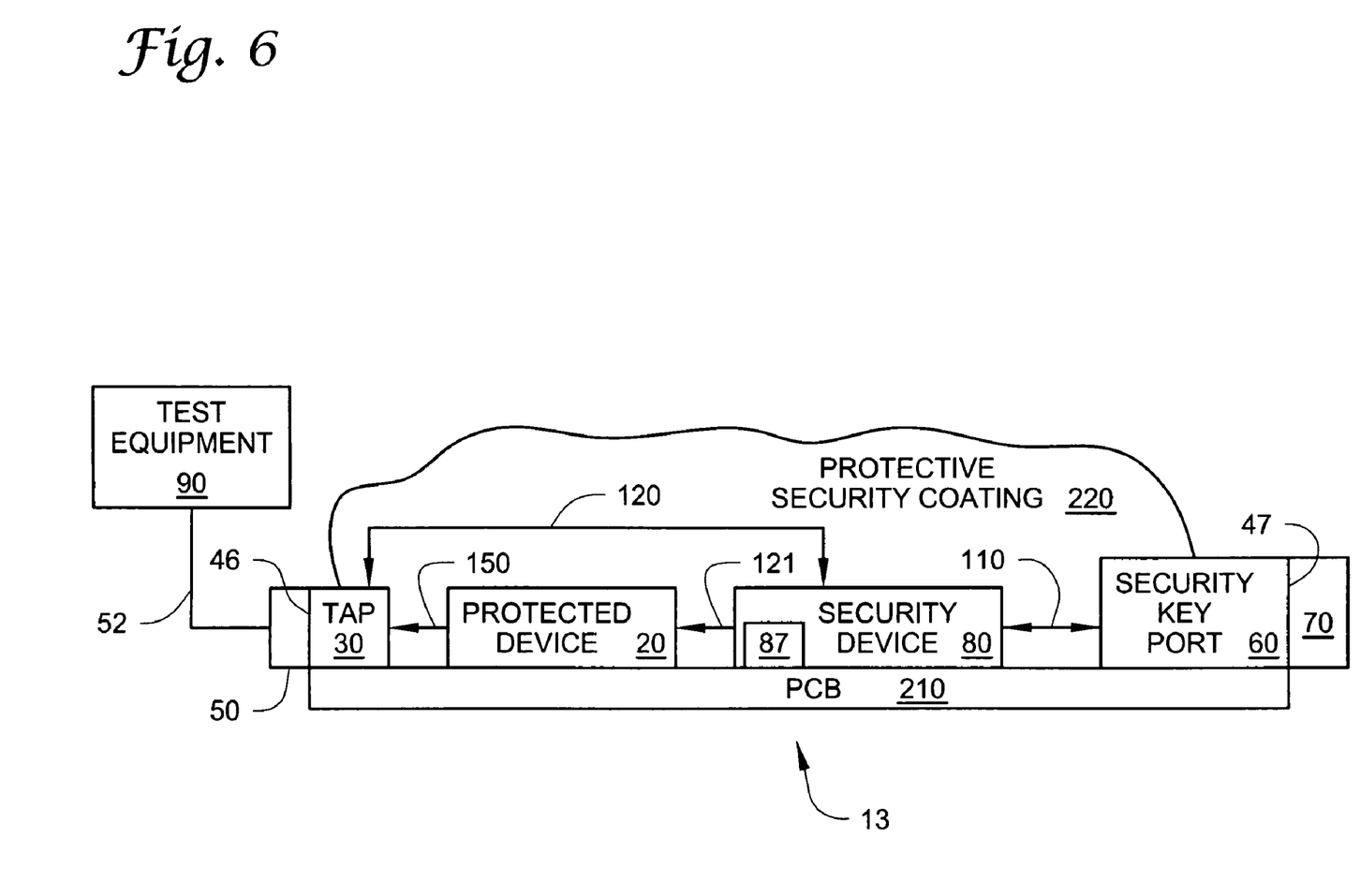
FIG. 6 illustrates a block diagram of an embodiment of a system to prevent unauthorized access to a protected device in accordance with the present invention.

FIG. 6 illustrates a block diagram of an embodiment of a system 13 to prevent unauthorized access to a protected device 20 in accordance with the present invention. The system 13 differs from system 10 of FIG. 1 in manner of protecting devices. In system 10 the protected device 20 is in a closed chassis secure from tampering or evaluation by unauthorized persons. In system 13, the protected device 20 is covered with an opaque protective security coating 220. When the system 13 is in an enabled state, the test equipment 90 has access to the protected device 20 as described above with reference to system 10 of FIG. 1.

The system 13 includes a test access port (TAP) 30, a security key port 60, a security device 80, which are operable to protect the protected device 20 from tampering. In this implementation of the system 13, the protected device 20 is located on a printed circuit board (PCB) 210 covered in part by an opaque protective security coating 220. The protected device 20 is secure from tampering or evaluation by unauthorized persons when covered the opaque protective security coating 220.

An outer surface 46 of the test access port 30 is not covered by the protective security coating 220 and the test access port is thus accessible and operable to mate with a test access connector 50. An outer surface 47 of the security key port 60 is not covered by the protective security coating 220 and the security key port 60 is thus accessible and operable to mate with a security key 70. The security device 80 is positioned in electrical or electro-optical communication with the test access port 30 and the security key port 60. The protected device 20 communicates the test-data-out output to the test access port 30 when the security device 80 is enabled.

The system 13 is in an enabled state when the security device 80 is enabled. The security device 80 is enabled when a valid security key 70 is mated with the security key port 60. When the security device 80 is enabled, the test equipment 90 is authorized for access to the protected device 20. The system 13 is in a disabled state when the security device 80 is disabled. The security device 80 is disabled when an invalid security key 70 is mated with the security key port 60 or when security key 70 is mated with the security key port 60. When the security device 80 is enabled, the test equipment 90 is authorized for access to the protected device 20 as described above with reference to implementations of flow diagram 400 of FIG. 4 and flow diagram 500 of FIG. 5.

Figure 7:
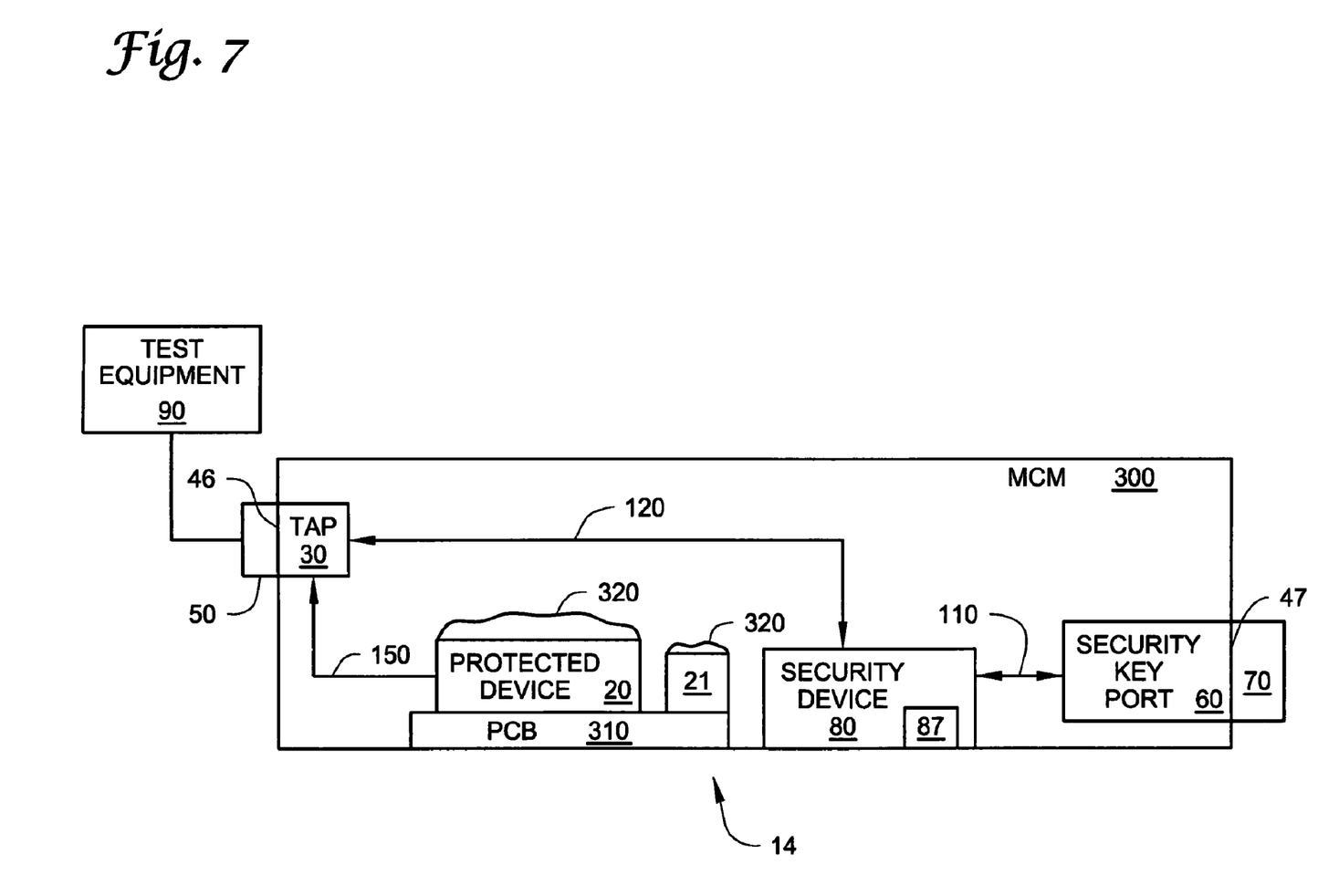
FIG. 7 illustrates a block diagram of an embodiment of a system to prevent unauthorized access to a protected device in accordance with the present invention.

FIG. 7 illustrates a block diagram of an embodiment of a system 14 to prevent unauthorized access to a protected device in accordance with the present invention. The system 14 differs from system 10 of FIGS. 1 and 2 and from system 13-of FIG. 6 in the manner of protecting devices. In system 14, the protected device 20 is enclosed within a multi-chip-module 300. As shown in FIG. 7, there is first protected device 20 that is a chip covered with an opaque protective security coating 320 and a second protected device 21 that is another chip also covered with an opaque protective security coating 320. In one implementation of this embodiment, the protected devices 20 and 21 are not covered with an opaque protective security coating 320. In another implementation of this embodiment, the multi-chip-module 300 is a closed integrated circuit package.

When the system 14 is in an enabled state, the test equipment 90 has access to the protected device 20 as described above with reference to system 10 of FIG. 1.

The system 14 includes a test access port (TAP) 30, a security key port 60, a security device 80, which are operable to protect the protected device 20 from tampering. In this implementation of the system 14, the protected device 20 is a plurality of protected devices 20 and 21, which are located on a printed circuit board (PCB) 210 and which are covered in part by an opaque protective security coating 220. The protected devices 20 and 21 are secure from tampering or evaluation by unauthorized persons when inside the multi-chip-module 300. In one implementation of this embodiment, one or more protected devices are located within a closed integrated circuit package.

An outer surface 46 of the test access port 30 is on or extending from the multi-chip-module 300. The test access port 30 is thus accessible and operable to mate with a test access connector 50. An outer surface 47 of the security key port 60 is on or extending from the multi-chip-module 300. The security key port 60 is thus accessible and operable to mate with a security key 70.

The security device 80 is positioned in communication with the test access port 30 and the security key port 60. The protected device 20 is in electrical or electro-optical communication with the test access port 30 when the security device 80 is enabled.

The system 14 is in an enabled state when the security device 80 is enabled. The security device 80 is enabled when a valid security key 70 is mated with the security key port 60. When the security device 80 is enabled, the test equipment 90 is authorized for access to the protected devices 20 and 21. The system 14 is in a disabled state when the security device 80 is disabled. The security device 80 is disabled when an invalid security key 70 is mated with the security key port 60 or when security key 70 is mated with the security key port 60. When the security device 80 is enabled, the test equipment 90 is authorized for access to the protected devices 20 and 21 within the multi-chip-module 300 as described above with reference to implementations of flow diagram 400 of FIG. 4 and flow diagram 500 of FIG. 5.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A system to prevent unauthorized access to a protected device, the system comprising:
   a test access port operable to mate with a test access connector;
   a security key port operable to mate with a security key; and
   a security device in electrical communication with the test access port and the security key port, wherein the connections between the test access port and the security device are independent from the connections between the security key port and the security device, wherein, when a valid security key operable to send a valid key input is mated to the security key port, based on one of periodic or continuous receipt of key input from the valid security key, test equipment input is one of periodically or continuously authorized for access to the protected device, the security device is enabled, and the protected device is in electrical communication with the test access port based on the security device being enabled.

2. The system of claim 1, wherein the test access port is a Joint Test Access Group (JTAG) port and the test access connector is a JTAG connector.

3. The system of claim 1, wherein the test access port is accessible from an outer surface, wherein the security key port is accessible from the outer surface, and wherein the protected device is one of located within a closed chassis, located under a protective security coating, located within a multi-chip-module, located within a closed integrated circuit package, located within a closed chassis under a protective security coating, located within a multi-chip-module under a protective security coating, or located within a closed integrated circuit package under a protective security coating.

4. The system of claim 1, wherein the security device is operable to receive
   a key input from the security key and a test-mode-select input from the test access connector, and wherein the security device comprises:
   an internal integrated circuit operable to determine if a key input is valid.

5. The system of claim 4, wherein the security key comprises:
   an external integrated circuit, wherein the security device is enabled when the internal integrated circuit authenticates the external integrated circuit based on a signal received from the external integrated circuit.

6. The system of claim 5, wherein the external integrated circuit authenticates itself with the internal integrated circuit, and wherein the authentication occurs one of periodically or continuously.

7. The system of claim 1, wherein the protected device is a chain of protected devices.

8. The system of claim 1, wherein the test access port includes a test-mode-select connection, a test-data-in connection, a test-data-out connection and a test-clock connection.

9. The system of claim 1, wherein if the security key is removed from the security key port prior to the test equipment sending a security termination code to the security device, input to the protected device is blocked.

10. A method to prevent unauthorized access to a protected device through a test access port, the method comprising:
    intercepting a test-mode-select input at a security device in communication with the protected device via a first circuit path;
    receiving a key input at the security device from a security key mated with a security key port, the key input being received one of periodically or continuously via a second circuit path, the second circuit path being independent of the first circuit path;
    determining if the key input sent from the security key is valid at the security device, wherein the determining if the key input is valid is a respective periodic or continuous determining, wherein the test access port is authorized for access to the protected device when a valid security key is mated to the security key port;
    enabling input of the test-mode-select input to the protected device based on a positive determination, wherein the protected device is operable to output test data at the test access port based on the enabling; and
    blocking input of the test-mode-select input to the protected device based on a negative determination, wherein the protected device is inoperable to output test data at the test access port based on the blocking input.

11. The method of claim 10, wherein the test access port is a Joint Test Access Group (JTAG) port, the test access connector is a JTAG connector, and the test-mode-select input is a JTAG input.

12. The method of claim 10, the method further comprising:

mating the security key to a security key port accessible from an outer surface; and inputting the key input to the security device based on the mating of the security key.

13. The method of claim 10, the method further comprising:

mating a test access connector to a test access port accessible from an outer surface;

receiving the test-mode-select input from test equipment at the test access port based on the mating of the test access connector; and inputting the test-mode-select input to the security device.

14. The method of claim 13, the method further comprising:

receiving a test-clock input at the test access port based on the mating of the test access connector;

inputting the test-clock input to the protected device;

receiving a test-data-in input at the test access port based on the mating of the test access connector; and inputting the test-data-in input to the protected device.

15. The method of claim 14, wherein enabling input of the test-mode-select input comprises:

providing a third circuit path from the security device to the protected device, wherein the test-mode-select input is input to the protected device via the provided third circuit path; and receiving a test-data-out output at the test access port based on the test-clock input, the test-data-in input and the test-mode-select input being input to the protected device.

16. The method of claim 15, wherein the third circuit path comprises one of an electrical circuit path, an optical circuit path, or an electrical circuit path and an optical circuit path.

17. The method of claim 10, wherein blocking input of the test-mode-select input comprises:

preventing establishment of a third circuit path from the security device to the protected device; and preventing a test-data-out output to the test access port based on the preventing establishment of the third circuit path.

18. The method of claim 10, wherein the protected device is one of located within a closed chassis, located under a protective security coating, located within a multi-chip module, located within a closed integrated circuit package, located within a closed chassis under a protective security coating, located within a multi-chip-module under a protective security coating, or located within a closed integrated circuit package under a protective security coating, and wherein the test access port is accessible from an outer surface, and wherein the security key port is accessible from the outer surface.

19. The method of claim 10, further comprising:

sending a termination code to the security device from test equipment; and if the security key is removed from the security key port prior to the test equipment sending a security termination code to the security device, blocking input to the protected device.

20. The method of claim 19, further comprising: implementing a separate security process by the user of the test equipment to unblock the input to the protected device responsive to the security key being removed from the security key port prior to the test equipment sending a security termination code to the security device.

21. A program product comprising program instructions, embodied on a non-transitory storage medium, that are operable to cause at least one of a programmable processor and a custom integrated circuit to:

receive a test-mode-select input at a security device in communication with a protected device via a first circuit path;

receive a key input from a security key mated with a security key port, via a second circuit path, the second circuit path being independent of the first circuit path;

determine if the key input sent from the security key is valid at the security device, wherein the test access port is authorized for access to the protected device while a valid security key operable to send a valid key input is mated to the security key port;

enable communication between test equipment and the protected device based on a positive determination; and block communication between test equipment and the protected device based on a determination.

22. The program-product of claim 21, further comprising instructions operable to cause at least one of the programmable processor and the custom integrated circuit to:

provide a third circuit path from the security device to the protected device, wherein the test-mode-select input is input to the protected device via the provided third circuit path; and receive a test-data-out output at a test access port based on a test-clock input, a test-data-in input and the test-mode-select input being input to the protected device.

23. The program-product of claim 21, further comprising instructions operable to cause at least one of the programmable processor and the custom integrated circuit to:

prevent establishment of a third circuit path from the security device to the protected device; and block input of a test-data-out output to a test access port based on the preventing.

24. The program-product of claim 21, further comprising instructions operable to cause at least one of the programmable processor and the custom integrated circuit to receive a termination code at the security device from the test equipment, wherein if the security key is removed from the security key port prior to the test equipment sending a security termination code to the security device, input to the protected device is blocked.

25. A system to prevent unauthorized access to a protected device, the system comprising:

means for receiving a key input at a security device, the means for receiving including a first circuit path;

means for determining if the key input is valid, the determining by the means for determining being one of periodic or continuous, wherein access to the protected device is authorized when a valid security key is mated to the means for receiving a key input;

means for providing test access to a protected device at the security device, the means for providing test access comprising a second circuit path and a third circuit path, the second circuit path being independent of the first circuit path; and means for controlling a test-mode-select input to the protected device based on a determination of the determining means.

26. The system of claim 25, wherein the means for receiving a key input comprises:

means for plugging a security key into a security key port.

27. The system of claim 25, wherein the means for controlling a test-mode-select input comprise:

means for controlling the third circuit path from the security device to the protected device; and means for one of allowing input of the test-mode-select input to the protected device or blocking input of the test-mode-select input to the protected device via the controlled third circuit path.

28. The system of claim 27, further comprising:

means for blocking the third circuit path from the security device to the protected device based on a positive determination becoming a negative determination when an invalid key input is received.

29. The system of claim 27, further comprising:

means for unblocking the third circuit path from the security device to the protected device based on a negative determination becoming a positive determination when a valid key input is received.

\* \* \* \* \*